(12) United States Patent
Ledesma et al.

(10) Patent No.: US 6,893,046 B2
(45) Date of Patent: May 17, 2005

(54) INDEPENDENT SUSPENSION UNDERCARRIAGE MODULE FOR A LOW FLOOR VEHICLE

(75) Inventors: Ragnar Ledesma, Sterling Heights, MI (US); Lawrence Brill, Westerville, OH (US); Steven E. Hunter, Lancaster, OH (US); Malcolm Green, Granville, OH (US); Duy Lam, Baltimore, OH (US); Mike Schuster, Rochester Hills, MI (US); Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 177 days.

(21) Appl. No.: 10/021,128

(22) Filed: Dec. 12, 2001

(65) Prior Publication Data

US 2003/0111834 A1 Jun. 19, 2003

(51) Int. Cl.[7] .................................................. B62D 7/22
(52) U.S. Cl. .............................. 280/788; 280/124.109; 180/311; 296/204
(58) Field of Search ......................... 280/788, 124.109, 280/124.135, 124.136, 783, 785, 786; 296/35.1, 204; 180/311

(56) References Cited

U.S. PATENT DOCUMENTS

| | | | | |
|---|---|---|---|---|
| 1,710,616 A | * | 4/1929 | Guernsey | 296/178 |
| 2,005,312 A | * | 6/1935 | Church | 180/55 |
| 2,093,859 A | * | 9/1937 | Austin | 296/178 |
| 2,700,428 A | * | 1/1955 | Nallinger | 180/89.19 |
| 2,722,987 A | * | 11/1955 | Dean et al. | 180/291 |
| 3,387,853 A | * | 6/1968 | Sueoka | 296/168 |
| 4,327,927 A | | 5/1982 | Tanaka et al. | |
| 4,393,955 A | * | 7/1983 | Van Mullem | 180/291 |
| 4,469,369 A | * | 9/1984 | Belik et al. | 296/178 |
| 4,515,390 A | | 5/1985 | Greenberg | |
| 4,752,086 A | * | 6/1988 | Hotta et al. | 280/792 |
| 4,934,733 A | * | 6/1990 | Smith et al. | 280/124.132 |
| 5,280,957 A | | 1/1994 | Hentschel et al. | |
| 5,558,361 A | | 9/1996 | Shin | |
| 5,611,569 A | | 3/1997 | Sekiguchi et al. | |
| 6,276,474 B1 | * | 8/2001 | Ruppert et al. | 180/65.6 |
| 6,354,616 B1 | * | 3/2002 | Morin et al. | 280/124.147 |
| 6,431,298 B1 | * | 8/2002 | Ruppert et al. | 180/65.7 |

* cited by examiner

Primary Examiner—Paul N. Dickson
Assistant Examiner—Toan To
(74) Attorney, Agent, or Firm—Carlson, Gaskey & Olds

(57) ABSTRACT

An independent suspension undercarriage module includes a first subframe segment and a second subframe segment. The subframe is manufactured of a composite material to provide a truss-like structural unibody which is mounted as a unit to the underside of a low floor vehicle through a plurality of resilient dampers. Passengers are thereby provided with a secondary vibration isolation structure separate from the suspension systems which filter out high frequency content generated by the suspension systems.

21 Claims, 2 Drawing Sheets

INDEPENDENT SUSPENSION UNDERCARRIAGE MODULE FOR A LOW FLOOR VEHICLE

BACKGROUND OF THE INVENTION

This invention relates to an independent suspension system, and more particularly to a suspension module which is attachable to a low floor mass transit vehicle.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides increased passenger space within the body of the vehicle, and may allow the overall height of the mass transit vehicle to be reduced.

Mass transit vehicles typically have several axles which support, drive and steer the vehicle. Many such vehicles provide a rigid axle having a gearbox at a longitudinal end to form an inverted portal axle configuration. Disadvantageously, this arrangement necessarily eliminates the ride benefits of independent suspension systems.

In other known embodiments, independent suspension systems have been available which provide the low floor vehicle with the ride benefits inherent in independent suspension systems. Unfortunately, the individual assembly and attachment of each component of a rather more complex independent suspension system is a time consuming and labor intensive process. Moreover, it is difficult to integrate the systems as the multiple independent attachment points prevent the systems from being installed simultaneously. These difficulties are further complicated by the arrangement of a low floor vehicle.

Accordingly, it is desirable to provide an independent suspension system which is attachable to a low floor mass transit vehicle in an uncomplicated manner.

SUMMARY OF THE INVENTION

The present invention provides an independent suspension undercarriage module that is previously assembled and collectively mounted to a low floor vehicle thereby reducing the number of assembly steps and contributing to an improvement in productivity, quality and serviceability.

The module includes a first subframe segment and a second subframe segment. The first subframe segment is located below a first profile segment of the vehicle floor which defines an aisle of a low floor vehicle while the second subframe segment is located below a second profile segment which defines the portion of the vehicle floor beneath the passenger seats.

The subframe is preferably manufactured of a composite material to provide a truss-like structural unibody which is mounted to the underside of the vehicle through a plurality of resilient dampers. Passengers are thereby provided with a secondary vibration isolation structure separate from the suspension systems which filters out high frequency content generated by the suspension systems.

The present invention therefore provides an independent undercarriage module which is attachable to a low floor mass transit vehicle in an uncomplicated manner and which provides additional passenger comfort.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF A PREFERRED EMBODIMENT

Figure 1:
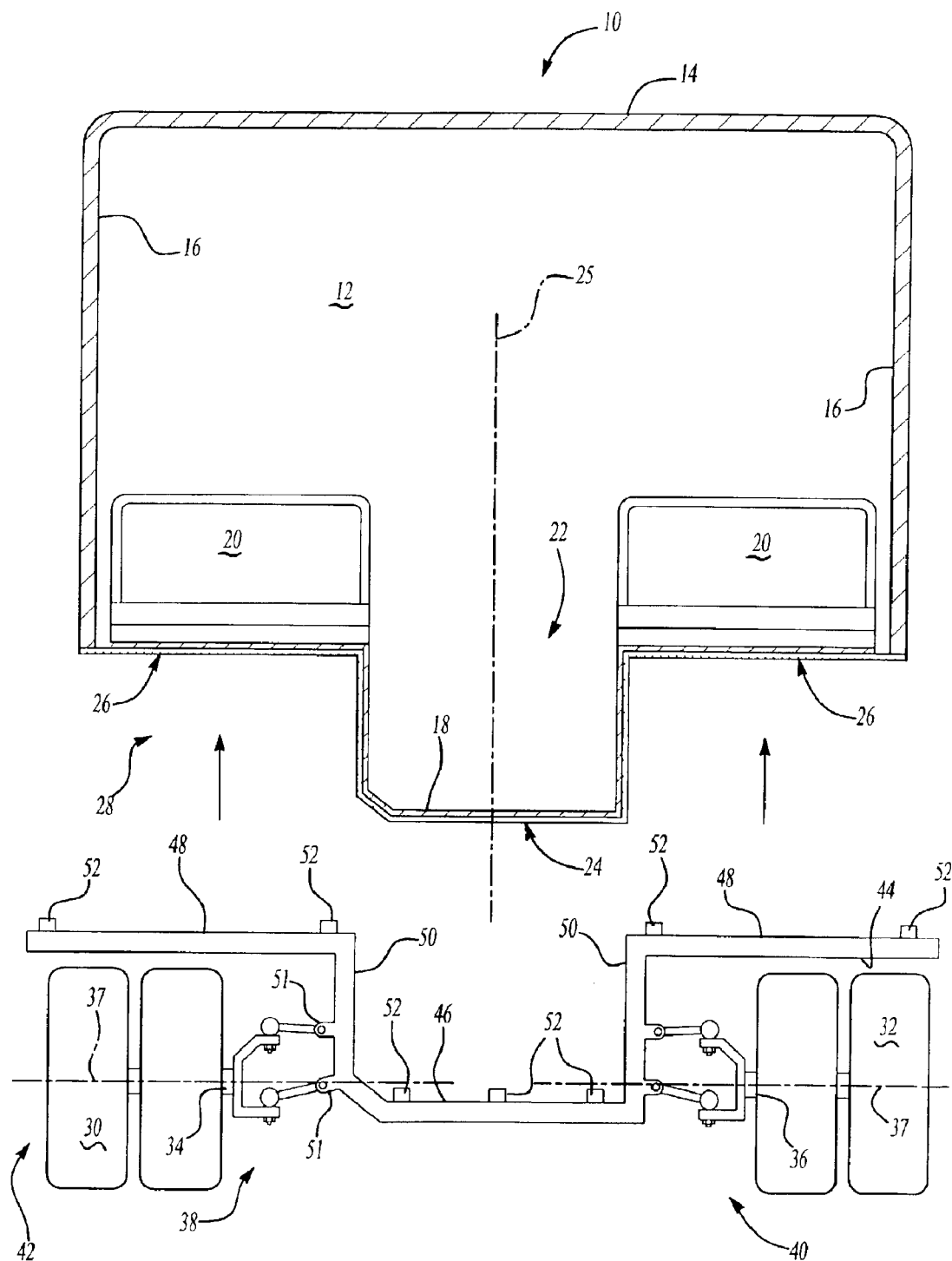
FIG. 1 is a cross sectional view of a vehicle incorporating the subject invention.

FIG. 1 schematically illustrates an exploded cross-sectional view of a vehicle 10 which includes a passenger compartment 12 defined by a roof 14, two sidewalls 16, and a vehicle floor 18. The cross-sectional view is taken transverse to the vehicle length. That is, substantially across the vehicle width. The vehicle 10 includes a multiple of passenger seats 20 mounted adjacent to each of the sidewalls 16 with a center aisle 22 extending along the length of the vehicle 10 and between the seats 20. In order to facilitate entering and exiting the vehicle 10, it is desirable to have the vehicle floor 18 and aisle 22 positioned relatively low to the ground. This provides increased passenger space 12 within the body of the vehicle 10.

The floor 18 defined beneath the passenger seats 20 and the aisle 22 defines at least two profile segments. A first profile segment 24 extends along a vehicle longitudinal axis 25 for a first length and a second profile segment 26 extends along the longitudinal axis 25 for a second length. The first profile segment 24 defines the floor of the aisle 22. The second profile segment 26 defines the floor 18 beneath the passenger seats 20. The profile segments 24, 26 further define an underside 28 of the vehicle 10.

A set of vehicle wheels 30, 32 are each mounted to an independent suspension system (illustrated somewhat schematically at 38, 40) adjacent the vehicle underside 28. It should be understood that vehicle 10 is typically provided with additional axles, driven and/or non-drive axles, and several sets of wheels including multiple pairs of wheels per axle.

A first and second hub assembly 34, 36 supports their respective wheels 30, 32. The hub assemblies 34, 36 each define a rotational axis 37 about which the vehicle wheels 30, 32 are rotated. The hub assemblies 34, 36 are each supported by the independent suspension system 38, 40 which allow the independent articulation of each hub assembly 34,36. It should be realized that although a particular upper and lower suspension link arm configuration is illustrated in the disclosed embodiment, other independent suspension systems will benefit from the instant invention. The instant invention is particularly applicable to non-driven suspension systems such as a steerable front suspension system.

The independent suspension systems 38, 40 are preferably mounted to the underside 28 of the vehicle 10 as an independent undercarriage module 42. As will be further described below the module 42 is an integral unit previously assembled and collectively mounted to the vehicle 10.

The module 42 includes a subframe 44 which is preferably substantially U-shaped but having a distal portion of the legs of the U bent outwardly. That is, the subframe includes a first subframe segment 46 and a second subframe segment 48 to substantially match the underside 28. The first subframe segment 46 is located below the first profile 26 segment of the floor 18 which defines the aisle 22. The second subframe segment 48 is located below the second profile segment 28 which defines the portion of the floor 18 beneath the passenger seats 20. The subframe 44 therefore supports the independent suspension systems 38, 40 which are attached through the module 42 to the underside 28 of the vehicle 10.

The independent suspension systems 38, 40 are mounted below the second subframe segment 48 and are preferably pivotally attached to a mount 51 mounted to an intermediate subframe segment 50 between the first subframe segment 46 and the second subframe segment 48.

Figure 2:
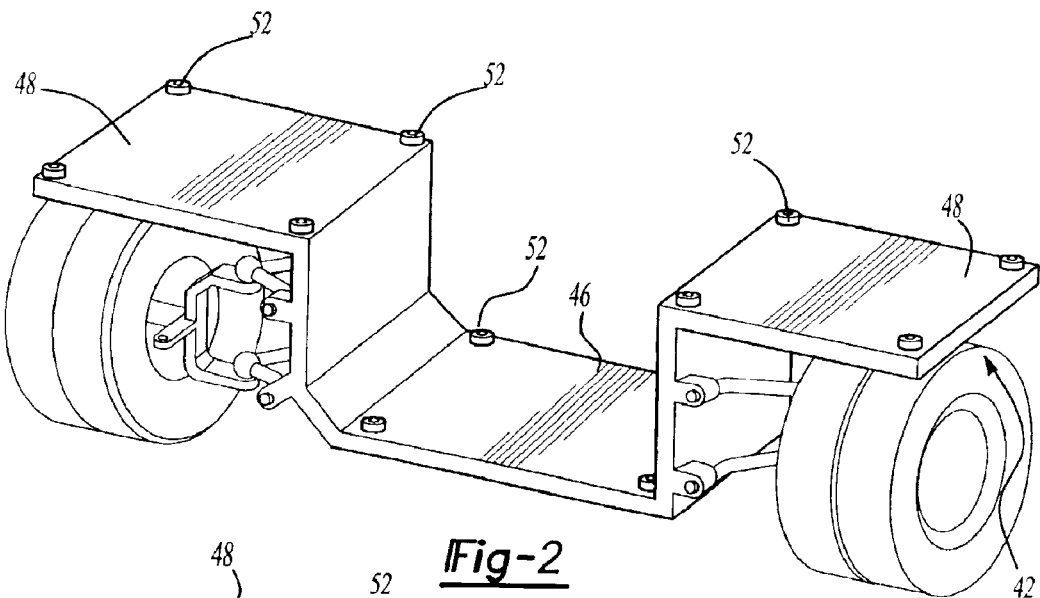
FIG. 2 is a perspective view of an independent undercarriage module of the subject invention.

Referring to FIG. 2, the subframe 44 is preferably manufactured of a composite material. Articles fabricated from fiber reinforced resin matrix composite materials are known, and have found increasing use in load bearing structural applications due to their high strength, light weight, and ability to be fashioned into complex shapes.

One technique for manufacturing composite components includes prepreg lay-up of composite materials. A composite component is formed from a substrate material having a plurality of parallel fibers that are saturated in a resinous material. The saturated fibers form a pre-impregnated (prepreg) material. The resulting impregnated substrate is considered a B-staged ply, ready for assembly ("lay up") into a laminate to be cured into a structural composite component.

Figure 3:
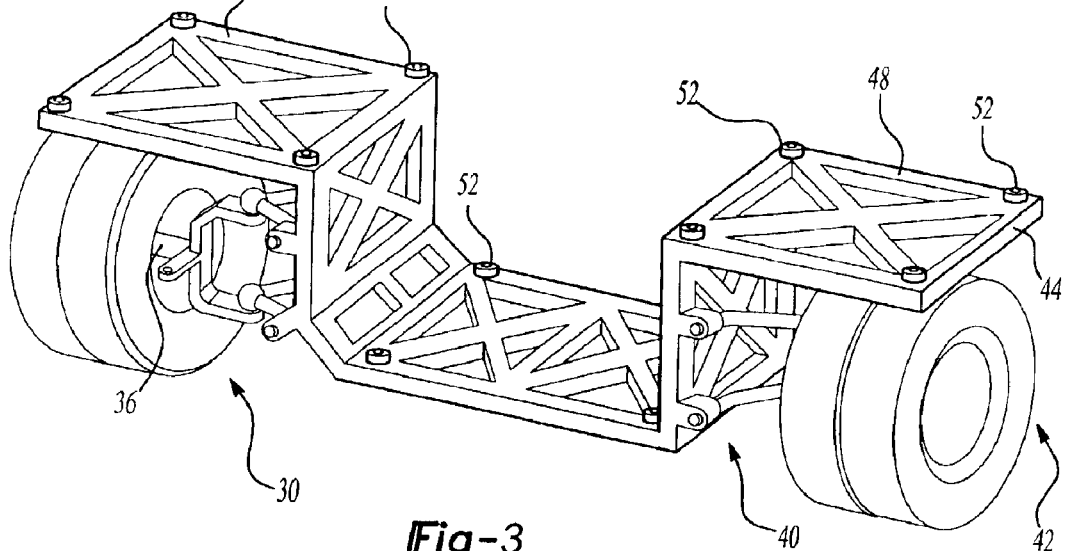
FIG. 3 is a schematic representative view of the structural rigidity of the subframe of the independent undercarriage module of FIG. 2.

By orientating the fibers of each layer in particular directions, a truss-like (FIG. 3) structural unibody is formed. Preferably, the layers are oriented to provide maximum stiffness in the torsional load. The subframe 44 is therefore relatively light, yet provides structural rigidity particularly tailored to the suspension systems 38, 40 of the vehicle (FIG. 1). It should be understood that the subframe illustrated in FIG. 3, is representative of the torsional characteristics of the subframe 44 (FIG. 2) which will preferably be formed as a single substantially continuous composite panel.

Figure 4:
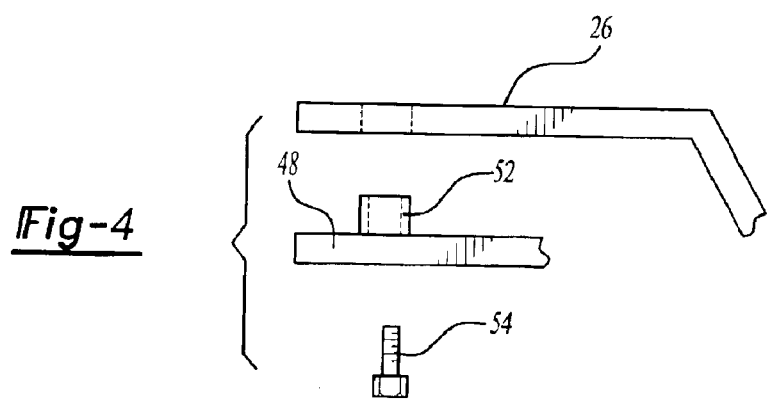
FIG. 4 is an expanded view of one module attachment arrangement according to the subject invention.

The module 42 is mounted to the underside 28 of the vehicle 10 through a plurality of resilient dampers 52 (also illustrated in FIG. 1). Fasteners 54 such as bolts or the like attach the module 42 to the underside 28 (FIG. 4). The fasteners 54 are preferably located through the dampers 52, however, other fastener locations may also be provided. The dampers 52 are preferably formed of an elastomeric material such as rubber or the like which isolate the module 42 from the vehicle underside 28. It should be understood that other resilient mounts such as mechanical, pneumatic, hydraulic, or the like will also benefit from the present invention. Preferably, the dampers 52 filter out high frequency content generated by the suspension systems 38, 40. Passengers are thus provided with a secondary vibration isolation structure separate from the suspension systems 38, 40.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An independent undercarriage module for a low floor vehicle comprising:
   a subframe having a first subframe segment mountable adjacent a first vehicle underside profile segment and a second subframe segment mountable adjacent a second vehicle underside profile segment, the first vehicle underside profile segment defining a floor for a vehicle aisle and the second vehicle underside profile segment defining the floor beneath a passenger seat; and
   a suspension system mounted to said subframe.

2. A module as recited in claim 1 wherein said suspension system is mounted substantially below said second subframe segment with reference to the vehicle.

3. A module as recited in claim 2 wherein said suspension system includes a non-driven vehicle wheel.

4. A module as recited in claim 1 wherein said subframe is manufactured of a composite material.

5. A module as recited in claim 4 wherein said subframe includes a laminale material which resists torsional loads.

6. A module as recited in claim 4 wherein said subframe is a single continuous member.

7. A module as recited in claim 4 wherein said subframe includes a multiple of substantially planar members.

8. A module as recited in claim 1 further including a plurality of resilient dampers mounted to said subframe.

9. A module as recited in claim 8 wherein said resilient dampers are mounted between said subframe and the vehicle underside.

10. A module as recited in claim 9 wherein said resilient dampers filter high frequency vibrations generated by said suspension system.

11. A module as recited in claim 1 wherein said first subframe segment is substantially parallel to and offset from said second subframe segment.

12. A module as recited in claim 1 wherein said subframe forms a portion of a vehicle underside.

13. An independent undercarriage module for a low floor vehicle comprising:
   a composite subframe having a first subframe segment mountable adjacent a first vehicle underside profile segment and a second subframe segment mountable adjacent a second vehicle underside profile segment, the first vehicle underside profile segment defining a floor for a vehicle aisle and the second vehicle underside profile segment defining the floor beneath a passenger seat;
   a suspension system mounted to said second subframe segment; and
   a plurality of resilient dampers are mounted between said subframe and the vehicle underside.

14. A module as recited in claim 13 wherein said subframe includes a laminate material which resists torsional loads.

15. A module as recited in claim 14 wherein said subframe is a single continuous member.

16. A module as recited in claim 14 wherein said first and second subframe segments are planar members.

17. A module as recited in claim 13 wherein said resilient dampers filter high frequency vibrations generated by said suspension system.

18. A module as recited in claim 13 wherein said first subframe segment is substantially parallel to and offset from said second subframe segment.

19. A module as recited in claim 13 wherein said subframe forms a portion of a vehicle underside.

20. An independent undercarriage module for a low floor vehicle comprising:

a composite material subframe, said subframe comprising a single continuous member having a first subframe segment mountable adjacent a first vehicle underside profile segment and a second subframe segment mountable adjacent a second vehicle underside profile segment, the first underside profile segment defines a floor for a vehicle aisle and the second vehicle underside profile segment defining the floor beneath a passenger seat; and a suspension system mounted to said composite material subframe.

21. An independent undercarriage module for a low floor vehicle comprising:

a composite subframe having a first subframe segment mountable adjacent a first vehicle underside profile segment and a second subframe segment mountable adjacent a second vehicle underside profile segment, the first vehicle underside profile segment defining a floor for a vehicle aisle and the second vehicle underside profile segment defining the floor beneath a passenger seat, said subframe comprises a single continuous member of a laminate material which resists torsional loads;

a suspension system mounted to said second subframe segment; and a plurality of resilient dampers are mounted between said subframe and the vehicle underside.

* * * * *

UNITED STATES PATENT AND TRADEMARK OFFICE
CERTIFICATE OF CORRECTION

PATENT NO. : 6,893,046 B2
DATED : May 17, 2005
INVENTOR(S) : Ledesma, Ragnar et al.

It is certified that error appears in the above-identified patent and that said Letters Patent is hereby corrected as shown below:

Title page,
Item [75], Inventors, replace "Mike Schuster, Rochester Hills, MI (US)" with -- Mike E. Schuster, Rochester Hills, MI (US) --

Column 4,
Line 20, please replace "laminale" with -- laminate --

Signed and Sealed this

Twelfth Day of July, 2005

JON W. DUDAS
*Director of the United States Patent and Trademark Office*